US007508799B2

(12) United States Patent
Sumner et al.

(10) Patent No.: US 7,508,799 B2
(45) Date of Patent: Mar. 24, 2009

(54) MANAGING WIRELESS NETWORK DATA

(75) Inventors: Terence Edward Sumner, Rowlett, TX (US); Scott S. Rassoulian, Chestnut Hill, MA (US); James Rodts, Southlake, TX (US)

(73) Assignee: Arch Wireless Operating Company, Inc., Westborough, MA (US)

( * ) Notice: Subject to any disclaimer, the term of this patent is extended or adjusted under 35 U.S.C. 154(b) by 1110 days.

(21) Appl. No.: 10/060,020

(22) Filed: Jan. 29, 2002

(65) Prior Publication Data

US 2003/0142641 A1 Jul. 31, 2003

(51) Int. Cl.
*H04Q 7/24* (2006.01)
(52) U.S. Cl. .................................... 370/338; 370/352
(58) Field of Classification Search ................ 370/338, 370/352
See application file for complete search history.

(56) References Cited

U.S. PATENT DOCUMENTS

| 6,477,156 | B1* | 11/2002 | Ala-Laurila et al. ......... 370/331 |
| 6,538,561 | B2* | 3/2003 | Angus ...................... 340/7.21 |
| 6,888,811 | B2* | 5/2005 | Eaton et al. ................ 370/338 |
| 2002/0080008 | A1* | 6/2002 | Angus ...................... 340/7.25 |
| 2002/0101858 | A1* | 8/2002 | Stuart et al. ................ 370/352 |
| 2002/0165024 | A1* | 11/2002 | Puskala ...................... 463/40 |
| 2003/0118015 | A1* | 6/2003 | Gunnarsson et al. ........ 370/389 |

OTHER PUBLICATIONS

Online staff *RF Solution to Develop Chipset for WLAN, Cell Phones*, Electronic News, www.e-insite.net/electronicnews/index.asp.
Ala-Laurila, Huha, et al, *Wireless LAN Acess Network Architecture for Mobile Operators*, IEEE Communications Magazine, Nov. 2001, pp. 82-89.
Mannion, Patrick, *Startup Shows Personal Gateway for Wireless Devices*, EE Times, Dec. 5, 2001, www.eetimes.com/story.
*New Advances Billing for 3G Wireless*, 3G Home cccc Free Daily 3G Newsletter, Jan. 21, 2002.

* cited by examiner

*Primary Examiner*—Duc C Ho
(74) *Attorney, Agent, or Firm*—Wilmer Cutler Pickering Hale and Dorr LLP

(57) ABSTRACT

In the context of managing wireless network data, access information for a wireless local area network (WLAN) is identified. The access information is accessible over a wireless packet data connection. Based on the access information, a connection is established between a wireless data device and the WLAN.

15 Claims, 7 Drawing Sheets

| WLAN Access List | | | | | | |
|---|---|---|---|---|---|---|
| SSID | Name | WEP Key | Logon-id | password | Proxy | Charge Rates |
| SSID | Name | WEP Key | Logon-id | password | Proxy | Charge Rates |
| ... | | | | | | |
| SSID | Name | WEP Key | Logon-id | password | Proxy | Charge Rates |

FIG. 6

MANAGING WIRELESS NETWORK DATA

This invention relates to managing wireless network data.

BACKGROUND

Modern local area networks (LANs) with their high bandwidths have become increasingly popular, especially with the advent of wireless LANs (WLANs). A WLAN permits handheld and portable computer users to connect to the LAN virtually anywhere in an office, in a building, or on a campus of buildings. The mobility of users requires that WLANs provide some level of interoperability so that a user located within range of one WLAN can move to within range of another WLAN and, in relatively seamless manner, be connected.

Security of WLANs is a consideration. WLANs are vulnerable to misuse by transient intruders, if access to the WLAN is not strictly controlled. An intruder with unfettered access potentially could download sensitive proprietary data from someone on the LAN or someone connected to the WLAN or could upload mischievous or dangerous data or software or could destroy data. Some access control methods identify the user requesting access, others require the user to prove his or her identity, and other, more secure, methods involve establishing a secure exchange of information before passing such information.

Network managers can make gaining unauthorized access to their WLANs more difficult by employing different protocols than other WLANs, but this approach can hinder the interoperability expected or relied upon by many users. At the lowest communication stack layer, changing the 'chipping' code of direct sequence or the 'hopping' sequence of frequency hopped spread spectrum WLANs allows the network manager to hide the manager's WLAN from unwanted intruders. Other layers in the communication stack are kept standard and interoperable. The security concerns of operators of WLANs have caused the WLANs, while nominally interoperable, to be incompatible or at least hidden from easy access by foreign (extra-organizational) wireless devices and users. Network managers typically do not want foreign users to consume resources and utilize Internet bandwidth provided for natives (users in the organization). WLANs have proven to be a popular and effective tool for data transfer to handheld and portable computer users residing natively on the WLAN.

Modern wireless wide area networks (WWANs) are also popular for their coverage of large geographic areas, such as cities, and for their penetration of buildings within the coverage area. In contrast to a LAN, a WWAN by its nature has data transfer rates that are lower owing to the limited bandwidth occupied by WWANs. The higher power utilized for wide area coverage is typically confined to smaller bandwidths to help keep transmitter power consumption reasonable and transmitter design practical. Thus, WLANs have high bandwidths over small coverage areas and WWANs have low bandwidths over large coverage areas.

SUMMARY OF THE INVENTION

In the context of managing wireless network data, access information for a wireless local area network (WLAN) is identified. The access information is accessible over a wireless packet data connection. Based on the access information, a connection is established between a wireless data device and the WLAN.

Implementations of the invention may provide one or more of the following features.

A wireless data transport system directs data transfer between a specific WLAN or a WWAN and a wireless device in cooperation with control messages from a WWAN or a WLAN.

A wireless device determines its location in cooperation with a WWAN, optionally in conjunction with a geo-location network or from user input. A WWAN control point conveys information to the wireless device about wireless local area networks in proximity, or anticipated to be in proximity, to the wireless device. Conveyed information includes necessary characteristics of the WLAN, such as frequency, modulation, a service set identifier (SSID), and an organizationally unique identifier (OID) portion of the MAC address. The control point may also communicate with an authorizing entity associated with the WLAN to send wireless device and/or user credentials to pre-authorize usage. The sending control point and authorizing entity can accommodate authentication of users on wireless devices or simple password logons. A billing service associated with the WLAN can report usage of wireless devices.

A wireless data transport system enables a wireless device to transfer data over a specific WLAN or a WWAN by control messages from the WWAN or through the WLAN. A control message is sent from the wireless device to a control point associated with the WWAN. The control message is received at the WWAN and, in cooperation with the wireless device, one or more candidate WLANs are determined to be compatible and expected to be in proximity. Information is conveyed from the control point to the wireless device, such information enabling the wireless device to access a candidate WLAN, or confirming information already in the wireless device.

In a wireless data transport system, charges are authorized that are attributable to the usage of a WLAN by a wireless device. A target WLAN is identified on which the control point associated with the WWAN desires to authorize charges. The identification information is conveyed to the wireless device, preferably via the WWAN or via another WLAN. A wireless device receives, from a control point associated with the WWAN, information sufficient to permit the wireless device to establish its identity and authority to use the target WLAN. The WLAN verifies that the purportedly authorized wireless device has permission to utilize the WLAN. Accounting data of usage on the WLAN is conveyed to the control point associated with the WWAN.

A wireless device capable of operating on both a WWAN and a WLAN includes a wireless transceiver compatible with a wireless LAN, a transceiver compatible with a wireless WAN, and software to enable switching between WLANs based on control messages received from a control point associated with a WWAN.

A wireless device capable of operating on both a WWAN and a WLAN includes software to assist the user in selecting a WLAN or WWAN based on expected usage charges as computed from charging information supplied, or to advise the user of charges accumulated for usage.

Implementations of the invention may provide one or more of the following advantages. Highly mobile and practical wireless data handling is achieved in which desirable characteristics of prior art WLAN techniques are retained, compatibility with WWAN techniques is maintained, little user intervention is required, and vulnerability to misuse from a security or a resource usage standpoint is not increased. Desirable features of standard wireless data transfer networks are retained while the user is permitted to take advantage of the high bandwidth of LANs and services available only through LANs, and to take advantage of the larger coverage of WWANs when appropriate.

Other advantages and features will become apparent from the following description, including the drawings, and from the claims.

BRIEF DESCRIPTION OF THE DRAWINGS

FIG. 6 is a diagram of a data structure in a wireless network.

DETAILED DESCRIPTION

Corporate or other high use electronic mail (e-mail) typically consumes significant bandwidth, especially in comparison to narrowband packet data use such as typical alphanumeric paging. Access to corporate or other organizational data over packet data wide area networks would be slow due to the low bandwidth, but is desirable because of the large coverage areas. A marriage between WLANs and WWANs is desirable, such that wireless devices, possibly including some nonnative devices, can utilize the larger bandwidth available on the WLANs, when and where available, and in other circumstances can utilize the more ubiquitous yet lower bandwidth on the WWAN.

Thus, it is useful to enable a WLAN to be utilized for data transfer when a compatible wireless device is in the current coverage range and to permit the device to revert to WWAN coverage when needed.

Figure 1:
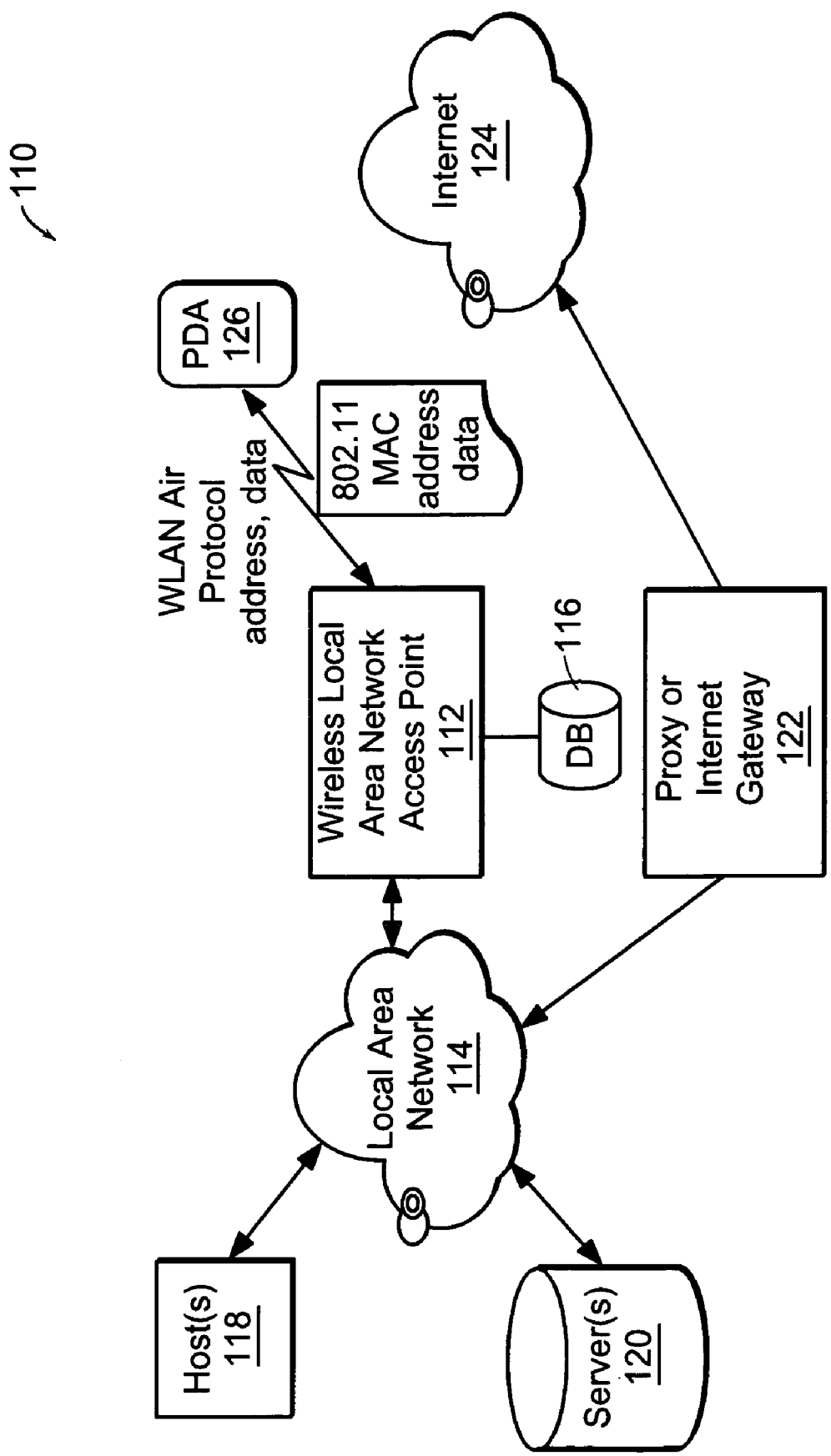
FIGS. 1-3 are diagrams of portions of wireless networks.

FIG. 1 illustrates that, in a wireless local area network (WLAN) 114, access points (APs) 112 are interconnected through a network, typically an Internet Protocol-based (IP) Ethernet (802.3) network or other private network, e.g. 802.11, that may include hosts 118, servers 120, and one or more gateways 122 to the Internet 124.

Each WLAN has an air protocol by which users connect to the network. The APs each have an associated database 116, specifying characteristics of the WLAN air protocol, including center frequencies, modulation, chipping codes and hopping sequences (SSID) used on the air, and organizationally unique identifier(s) (OIDs) valid on the air.

In addition, wired equivalent privacy (WEP) information is used in cooperation with an authentication mechanism to assure only authorized access by devices such as a PDA 126. An AP having access to a list of authorized wireless devices along with associated methods and authenticating information can ascertain the authority of the wireless device and users to access the network. Services accessible to an authorized user, including data transfer, may have different attributes, such as speed, volume, and reachable destinations or sources, from other users, and these attributes may be controlled and enforced from within the access point.

Figure 2:
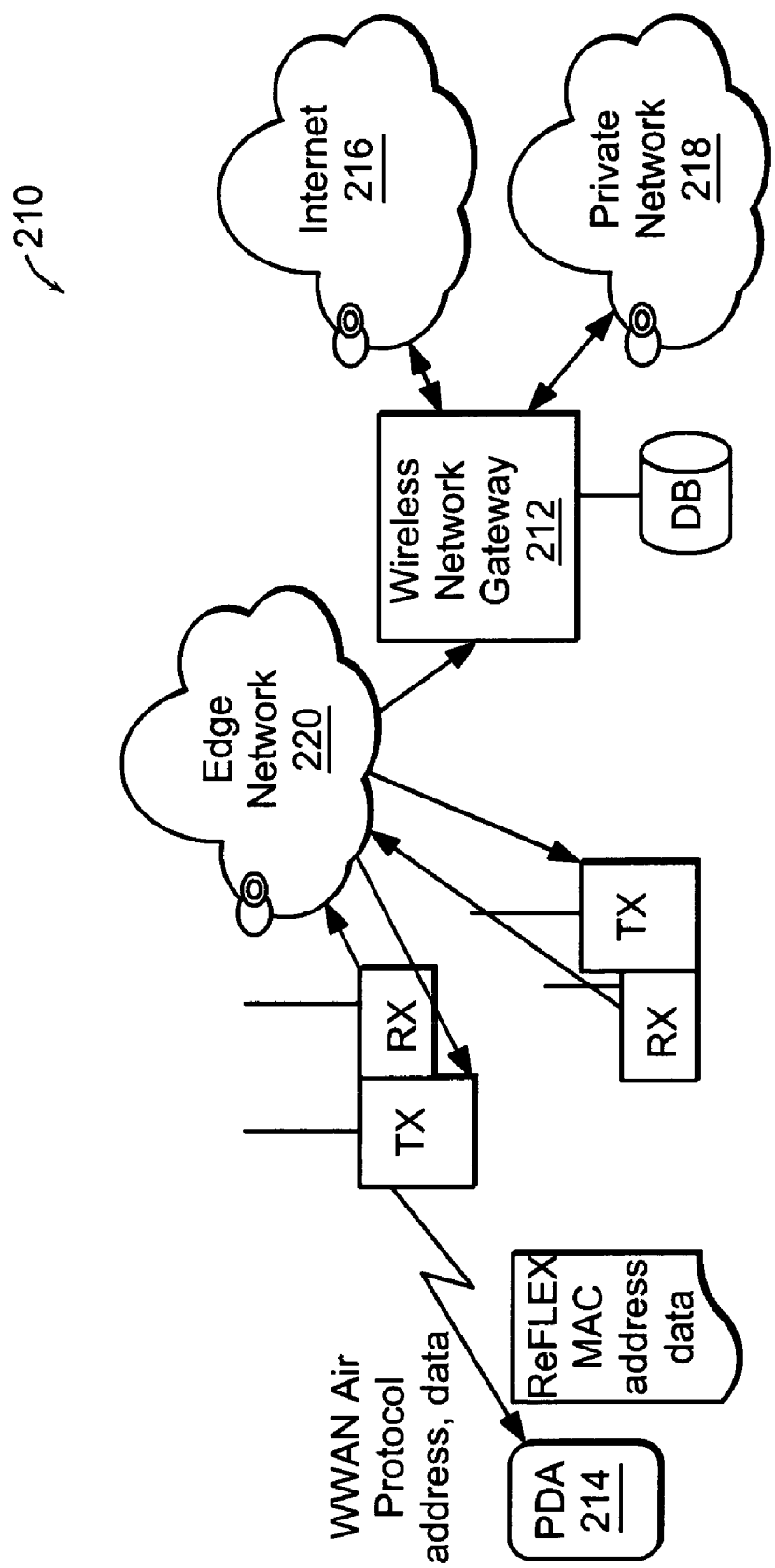

FIG. 2 illustrates that, in a wireless wide area network (WWAN) 210, a wireless network gateway 212 connects a WWAN user having the user's own wireless device 214 using an edge network 220 having an air protocol and characteristics suitable for WWAN, to the Internet 216 or a private data transport network 218.

Figure 3:
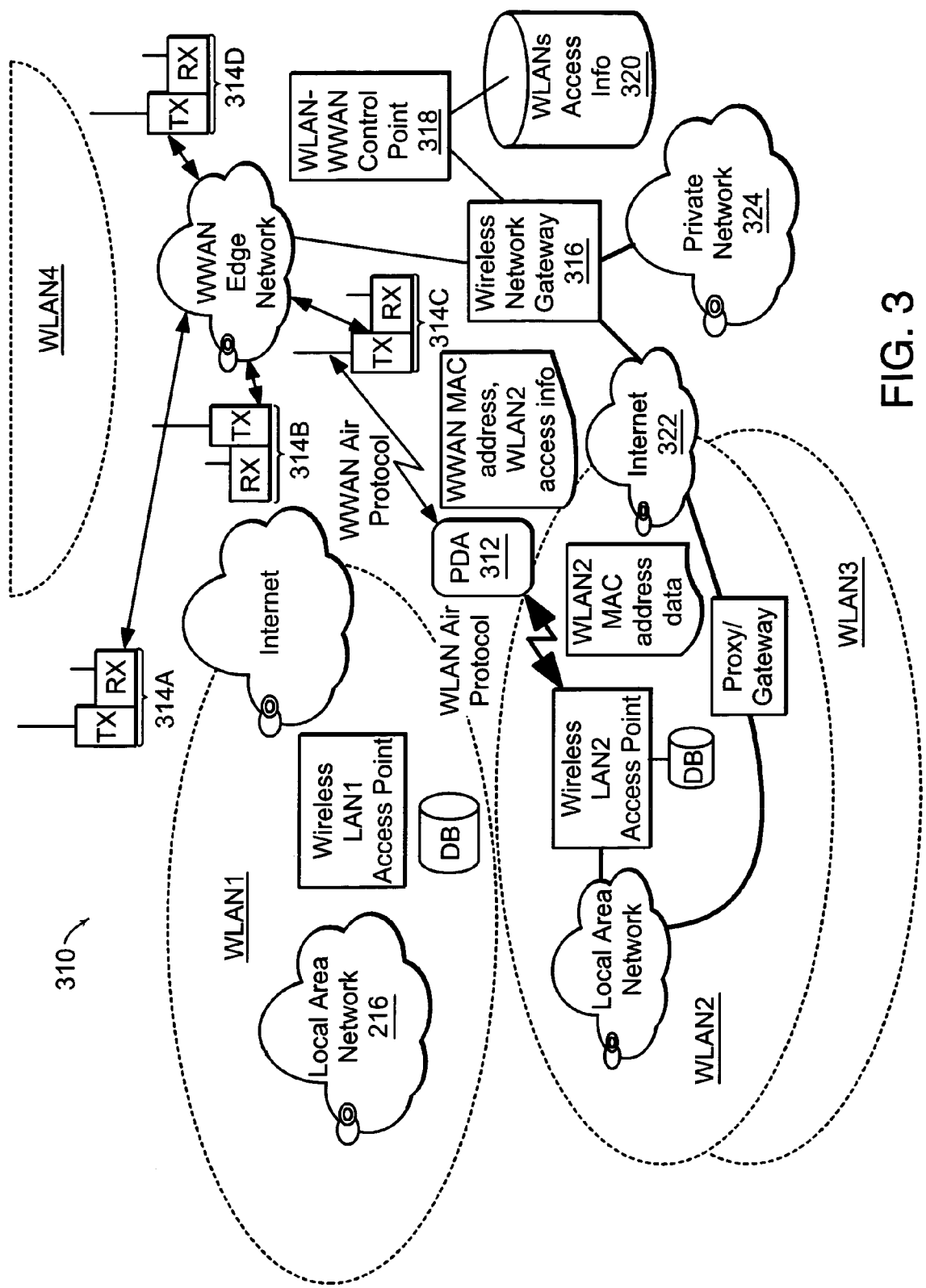

FIG. 3 shows portions a data transport system 310 in which two WLANs, WLAN2, and WLAN3, with largely overlapping coverage are in proximity to each other, along with another WLAN, WLAN1, fully isolated in coverage from the other WLANs. WLAN1 and WLAN3, all under the coverage of the WWAN. An additional WLAN, WLAN4, is also depicted with only partial coverage under the WWAN. Typically, the air protocol utilized by the WWAN, which is provided for wide area applications with emphasis on efficient transport of error-free data, is distinct from air protocols used by a WLAN. A wireless device 312 suitable for responding to data broadcast in WWAN air protocol and responsive to the air protocol is depicted in coverage of the WWAN. Coverage is provided by a plurality of transmitters and receivers 314A-314D deployed around the covered area.

Within the WWAN is a wireless network gateway 316 that can send traffic either over the WWAN or over a link connected to one of multiple WLANs. Connected to the gateway is a control point 318 with its associated database 320 of access information on various WLANs. A connection from the gateway is provided, preferably to the Internet 322 or alternatively to a private network 324. Traffic for a wireless device may originate over these connections or may be directed to destinations on them such as hosts and servers. In addition to data traffic destined for the wireless device, control traffic is carried on the links to assist the wireless device in detecting and accessing various WLANs and to authorize the wireless device to utilize the various WLANs. In addition, charging rates and accounting data related to usage of a WLAN by authorized devices may be carried back to the WWAN gateway.

Access information for the various WLANs that may have a business relationship with the provider of the WWAN is stored in a database and may change from time to time. In a specific implementation, access information includes at least enough technical detail to permit a wireless device to detect the WLAN when within range and enough additional access information to enable a wireless device to pass the security methods employed by the WLAN. In those cases where a WLAN requires a user to log on and identify himself or herself and thus be pre-authorized, a valid logon identifier and associated authentication mechanism is maintained in the access information files for each such device so authorized. For simple logon-password systems, a list of valid identifiers and associated passwords is kept, along with validity information. For strong authentication systems, a list of authorized entity names and their associated authentication credentials is kept.

Access information, and if required, the logon-password or the matching portion of authentication credentials for the wireless device client are conveyed to the wireless device preferably in advance of the desired use of the target WLAN. Conveying the information significantly in advance has advantages of utilizing off-peak times to avoid traffic congestion and permitting low-latency access, but requires a larger memory in the wireless device to accommodate the information. A wireless device may dynamically request access information or it may be pre-loaded with access information with all networks for which the device is expected or directed to come into coverage. A wireless device that is itinerant in a pattern of various WLANs needs to have access information on at least those WLANs it uses or traverses in its travels, but economic reasons may override the convenience. Some WLAN administrators may not permit foreign access to their facilities except by a strictly controlled group. Other WLAN administrators may permit broader access but only with exorbitant charging rates. Including charge rates in the access information database is desirable.

The WWAN preferably determines the proximity of the wireless device to a WLAN in cooperation with the device. The WWAN typically has overlapping coverage with the WLAN coverages, such that a wireless device can simultaneously be in range of a transmitter and a receiver of the WWAN and an access point of one or more WLANs. This overlap is desirable from an operational point of view to minimize time to access because the wireless device does not have to scan blindly for all possible nearby WLANs. When a wireless device responds to a WWAN broadcast it can identify the transmitter from which it received the broadcast and the WWAN can correlate the identification with the receivers that the wireless device can reach, thereby approximating a geo-location of the wireless device.

Figure 4:
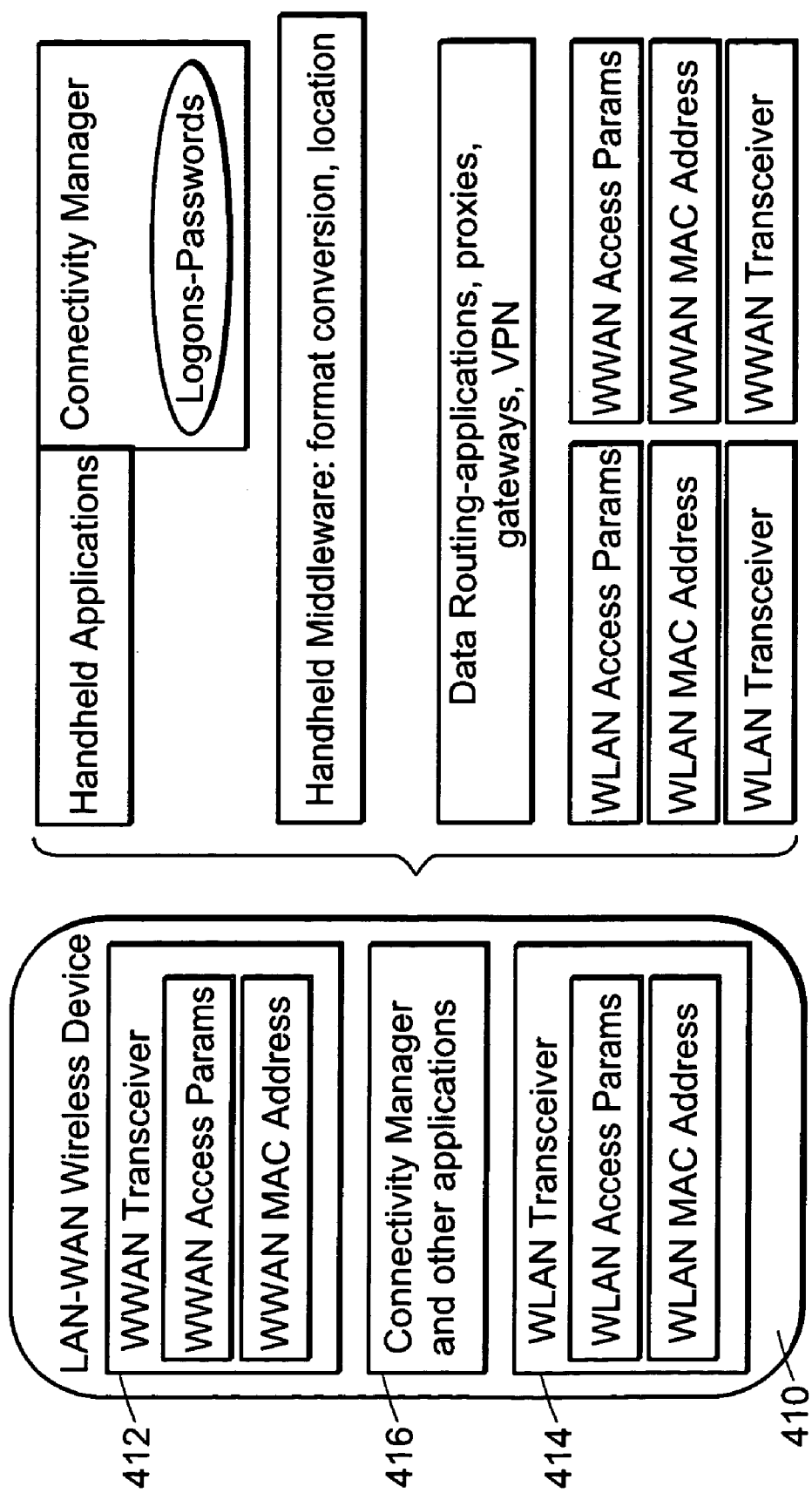
FIG. 4 is an diagram of wireless devices.

Referring to FIG. 4, a wireless device 410 contains at least one WLAN transceiver 414 and at least one WWAN transceiver 412 (or a multiplexed WWAN-WLAN transceiver), each utilizing an air protocol with a MAC (media access control), or air-protocol, address of the wireless device. Wireless device 410 also has a connectivity manager and other applications 416. WLAN transceiver 414 may have some of its parameters configured dynamically to facilitate detection and access to the WLAN access point. In at least some cases, WLAN devices do not offer field modifiable OIDs or addresses, and they cannot be enhanced except with difficulty. In 802.11b, in an example, a WLAN displays a SSID that identifies the network and the access point may restrict access to those devices having addresses that belong to a certain organizationally unique identifier (OID). As a result in such a case, a wireless device trying to connect would need to alter its OID to match the restriction and possibly the address portion, without duplicating an existing address. The WLAN restricting access to certain OIDs preferably advises a requesting WWAN gateway of a proper full address including OID that the wireless device can use.

A wireless device that is highly mobile may cache an inventory of access information on several WLANs so as to minimize interaction with the control point. In some cases the information may be durable enough to cache for long periods and be reusable by the device. In other cases the duration of validity of access for a particular identifier may be so curtailed that reuse after a short period of time is not possible, in which case caching in the wireless device is less helpful. Duration of validity or other limiting factors, such as volume of usage, preferably is maintained in association with the WLAN access information in the wireless device.

Wired equivalent privacy (WEP) technology is used in a layer used in some 802.11 networks that can help prevent unauthorized foreign users from accessing the WLAN by requiring use of a proper key or initialization vector (IV). A logon identifier and password may be required instead or in addition in order to access some systems, for example, employing a Radius server. In these cases, the key, IV, logon ID, password, and other appropriate information that is needed to access the WLAN is conveyed and at least cached in the wireless device and associated with the WLAN. Additional security measures, such as employing user authentication requiring individual certificates, are also conveyed to the responsible parties in the system of control point, access point, and wireless device. For example, the control point can convey a public-key certificate to the access point so that the private key stored inside the wireless device can be used to authenticate the user upon accessing the desired WLAN.

A wireless device that advises the user a priori of expected charges is desirable, especially when rates are much higher than normal, allowing the user to delay data transfer until moving within coverage range of a lower rate WLAN, or to utilize the WWAN for delivery.

A wireless device can have a geo-locating device, for example, a GPS device, to aid in the determination of its location. The reported latitude-longitude coordinates can then be correlated to a set of WLANs that are in proximity to the wireless device. In some cases external wide area networks may have difficulty penetrating objects, such as building walls, to provide simultaneous WWAN and WLAN connectivity. In such cases the user may be able to identify the user's wireless device location by appropriate selection on the wireless device itself, e.g. 'Isolated Secure LAN—Cheyenne Mountain' instead of relying on network or GPS determination of location.

In exercising choice over WLANs, a user may be interested in more than the mere availability of the network, but also in other factors, such as security, the quality of signal (QoS) received from a WLAN due to its heavy influence on throughput, and the cost of connecting through a particular WLAN. To aid the user in making an optimal choice, the connection availability preferably displays expected throughput, charging rates, security information, and other attributes that make affect the choice.

Figure 5A:
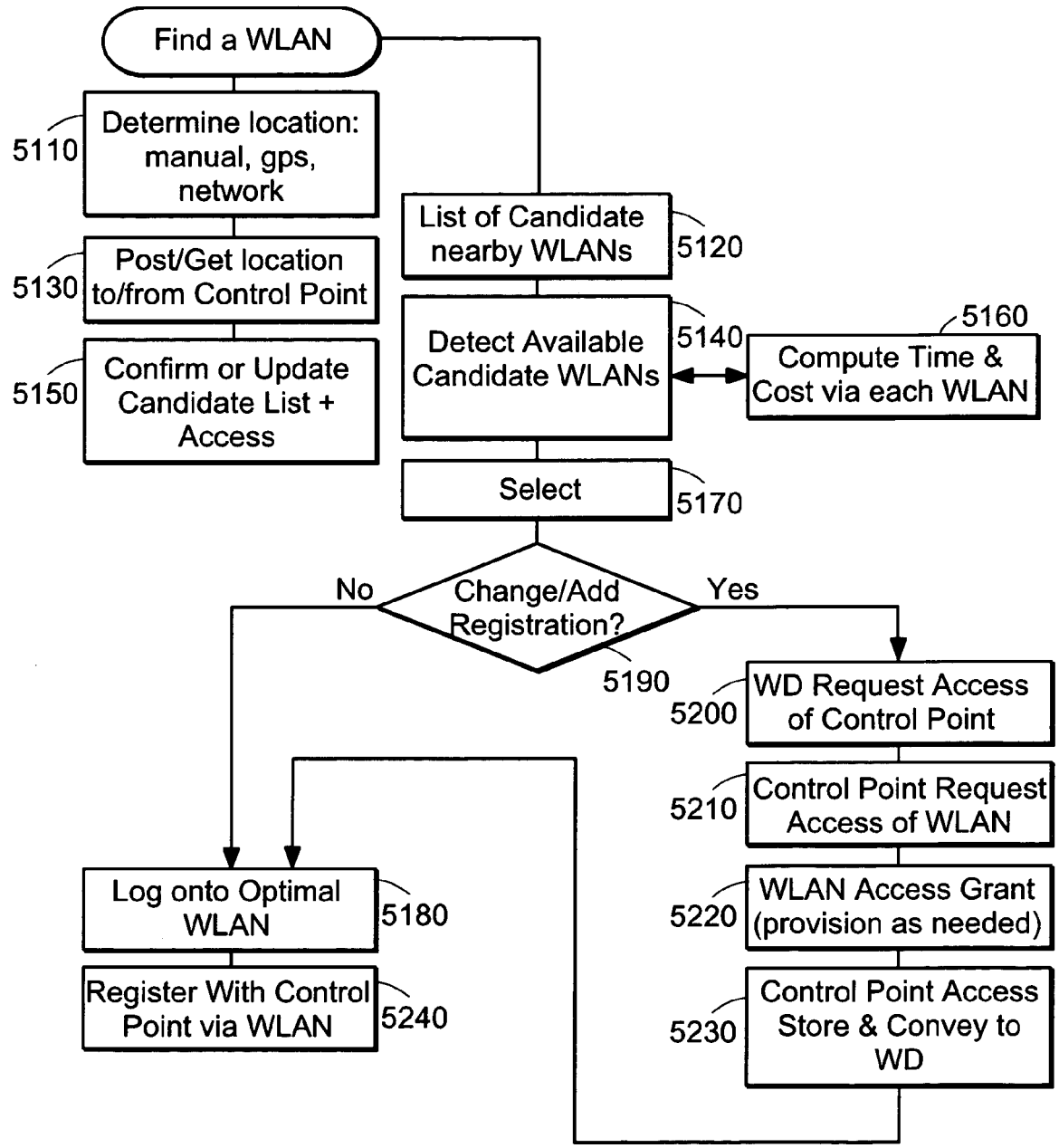
FIGS. 5A-5C are flow diagrams of procedures in a wireless network.

Referring to FIG. 5A, a wireless device (WD) cooperates with a WWAN control point to find a WLAN. In an initial step 5110, the wireless device may determine its location manually by user input of location information or selection of pre-existing WLANs from a list. The wireless device may be equipped with an adjunct GPS module, or similar accessory, that can determine its geo-location independently of the WWAN or user input. Preferably, the wireless device's location is approximated by information developed within the WWAN as to transmitter and receiver site locations and possibly bearing and distance. From this step in substantially concurrent fashion the wireless device (WD) develops a list of candidate WLANs (step 5120) and cooperates with the control point by posting its location to the control point as determined from a geo-locating network such as GPS or by getting its location as determined by the WWAN network from the control point (step 5130).

From the list of candidates the WD begins scanning frequencies in conjunction with existing access information to detect which of the WLANs on the list are in fact in range (step 5140). The WWAN control point in cooperating with the WD on location determination develops a list of candidate WLANs to update or supplement the list generated by the WD and then conveys these to the WD (step 5150). The control point preferably may confirm the location reported by the WD and confirm the identities of WLANs already known or cached within the WD in order to conserve bandwidth. The detection step continues concurrently while the list is updated and confirmed. A step 5160 to compute time and cost metrics for each available candidate also preferably runs at least partially concurrently with detection step, but may run sequentially afterward.

A selection is made (step 5170) after at least one of the candidate WLANs has been detected, based on factors of importance to the user or as conveyed from the control point, such as speed, charges, and security. After the selection step, the WD attempts to log onto the selected WLAN (step 5180). The access information may already be cached in the WD or it may need to be supplied by the control point (step 5240). The WED may be registered on more than one WLAN at one time.

If the WD needs additional logon or other access information (step 5190), the information is requested from the control point (step 5200), which in turn supplies it or may further request the information of the Access Point of the target WLAN (step 5210). Information supplied by the AP is stored in the access information database associated with the control point (step 5220) and is also conveyed to the WD (step 5230). The control point may pre-authorize any number of users in anticipation of a request, but the AP may require strong authentication and association of identity of an authorized WD and thus hinder such advance authority. The WD, having the proper access information, proceeds to log onto the WLAN in the next step. Preferably, once logged on, the WD issues a registration message via the very WLAN just logged onto, to the control point, confirming accessing and notifying control point of a path to the WD.

Figure 5B:
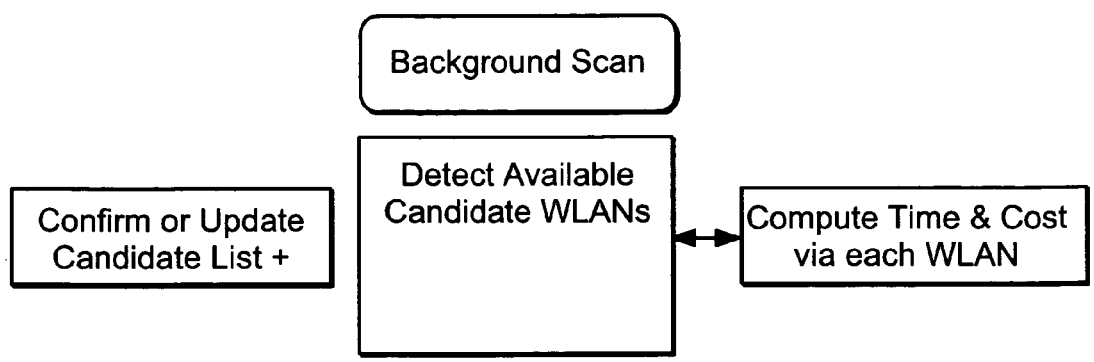

Referring to FIG. 5B, a WD preferably scans in the background when not otherwise occupied for new available WLANs and maintains the candidate list in a substantially current state. In addition, other factors to pre-sort the candidate list, such as charges and speed available, can be maintained in a state of readiness. Readiness to log onto another WLAN is important when applications are of an urgent nature or when usage is actively engaged. Readiness becomes more critical when the current active WLAN connection begins to degrade in performance, especially bit rate.

Figure 5C:
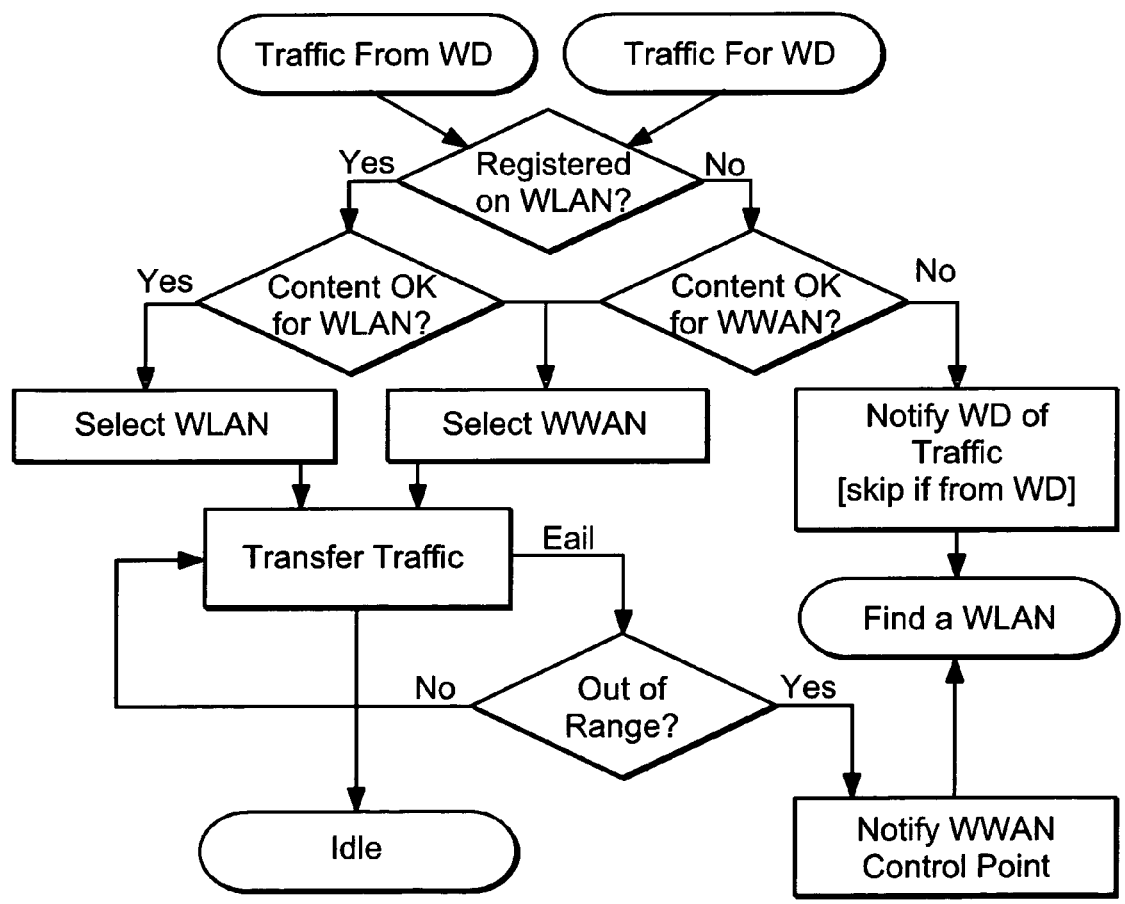

Referring to FIG. 5C, two possible triggering events for delivery of traffic are depicted: traffic originating from a WD and traffic at a gateway for a WD. If the WD is registered and the content of the traffic is appropriate for WLAN delivery, the traffic is transferred over the already registered WLAN link. The traffic may contain content that the registered WLAN should not bear, such as sensitive data in the clear or the charges for delivering it exceed that for the WWAN, in which case the WWAN link is selected for transfer of the traffic. A WLAN network manager may consider a confirmation of registration on a competing network as justification to drop the link and thus the confirmation would be sensitive information, for example.

On the other hand, if the WD is not registered on a WLAN and a large amount of traffic is awaiting delivery, which would be inappropriate for delivery via WWAN, a notice is sent to the WD about the pending traffic and the process jumps to finding a WLAN for delivery. While pending, the user may override the decision made by the gateway and have the traffic delivered via WWAN or the gateway may begin delivery via WWAN on its own due to the urgency of the traffic with completion of the traffic via WLAN when available. Essentially, the gateway assumes that wide area coverage is valid and should be utilized until notified to the contrary by the wireless device user. In the process of notifying the WD of pending traffic, the WWAN may develop network location information that will aid the WD in the finding process. Preferably, such information is conveyed expeditiously without further solicitation from the WD.

During a transfer of data a failure may occur, especially due to the mobile nature of the WD. If the WD determines that it is out of range, it notifies the control point of the problem and jumps to finding a better WLAN for delivery. Degradation in throughput, similarly, can result in suspension of delivery via one WLAN and resumption via another by way of the same notification step and finding a WLAN.

Use Cases

The following use cases are examples of uses of wireless data transport systems that direct data transfer between a specific WLAN or a WWAN and a wireless device.

First Case

In a first use case, a mobile user Mike has a known pattern.

The mobile user works for a large corporation. He travels frequently to various offices and field locations. He needs to remain in contact with the head office, as well as regional offices. He also needs to be able to access data stored on the corporate mainframe for reconciliation with other data he examines on smaller computers in his travels.

In accordance with his duties, the mobile user may arrive at an office or field location with little or no notice. Typically, the day before his arrival, he travels by air to a hotel near the office or field location. After staying overnight in a hotel, he reports to the office or field location at the start of business the next day.

While on location, he accesses various files on the mainframe and servers in the head office. He also checks his e-mail on the email server (e.g., Microsoft Exchange Server). His company also runs an instant messaging (IM) system on its internal network that his boss uses to communicate with Mike while Mike is working. The IM system also allows Mike to issue instructions to Lee, his administrative assistant, relating to Mike's work at his current location.

In the case of conventional technology, without the present invention, Mike's activities may proceed as follows. On landing at the airport, Mike turns on his palmtop computer with attached pager card. The pager automatically establishes communications with a pager or other packet data network (e.g., Arch Wireless, Inc.'s ReFLEX-25 nationwide network) that uses a tower site near the airport, and the pager registers its location. The location is known to be near the pager network infrastructure's receivers, but the registered service zone is normally quite large (e.g., a metro area). The network is capable of resolving the location to the nearest transmitter in addition to nearby receivers. Messages for Mike that were held pending his registration while he was en route in the air are delivered. Mainly they are notices of e-mails received after he left the office, although a complete e-mail message marked urgent from Lee indicates that the hotel was forced to re-book him into an alternate hotel due to a problem next door. The urgent message includes the new hotel name and address and a phone number.

Mike collects his car after checking the itinerary stored in his palmtop computer earlier that afternoon. He consults with the rental counter about directions to the new hotel and heads there.

At the hotel he inserts a modem card into his palmtop and dials the company server after plugging the modem into the phone line. Mike uses a virtual private network (VPN) client to secure his connection through external networks. He downloads his e-mail messages, which include some notices from the voice-mail system of voice messages waiting on the PBX. After hanging up, he picks up and dials the PBX voice mailbox to play back his voice messages.

On arrival at the office the WLAN card he inserted earlier senses the company wireless LAN and logs on. The IM system starts delivering pending IMs from Lee and Mike's boss.

In the case of technology that includes the present invention, Mike's activities may proceed as follows. The pager card also contains a WLAN transceiver with a unique 48-bit MAC address. (The pager also has a unique 30-bit address according to the ReFLEX protocol. For simplicity in this example, the 48-bit address and the 30-bit addresses are collectively referenced as "the MAC address" even though the two addresses are formatted differently and are not related.) The pager card may include or be derived from a Glenayre or Advantra ReFLEX card, and the card's WLAN transceiver may include 802.11 circuitry. Both pager and WLAN transceivers may be mounted in a single detachable card for convenience. Inside the detachable card an integrated circuit (IC) for 802.11 WLAN and an IC for ReFLEX may be interconnected by an application specific IC (ASIC) and the card may be controlled by a microprocessor, such as a Motorola 6805, although both transceivers and the application-specific circuitry and microprocessor may be integrated into a single device. Alternatively, the palmtop computer's or PDA's processor may be used to control the transceivers.

On Mike's arrival at the airport, when the pager is activated, the WLAN card is also activated and begins scanning for compatible networks, e.g., 802.11b compliant networks. The WLAN card will scan, as best it can, for compatible networks, but due to implemented restrictions it may not find a network.

Within the airport proper, more than one WLAN may be found. The Service Set ID (SSID) for that WLAN must be already programmed (see the WLAN access list of FIG. 6) into Mike's WLAN card or the "ANY" setting is used. The WLAN is addressable using the WLAN MAC address in Mike's device or a new programmed MAC address, and a WEP Key is used if required by the WLAN.

On the device display a dialog box appears advising that a particular WLAN network for the airport was found and can be logged onto (e.g., MobileStars$^{SM}$). Within the device an SSID, e.g., "WLANStar", is used in the Association phase of the logon. To access the WLAN the valid Wired Equivalent Privacy (WEP) key for the WLAN network, e.g., '0a35f97ce6', is used to authenticate and encrypt data to the WLAN. Mike then logs on with user-id "company-mike" and password (b33LzbUb).

In order to access a WLAN, a compliant card must have the WEP Key in use by the WLAN. The WLAN may not have enabled WEP, but assuming it has, the key is required. Logging on occurs after and above the WEP Key submission process.

While the connection to the WLAN is being established, an application dialog box opens an email application (e.g., Outlook Express) that uses the available Internet connection through the WLAN to connect to the company's mail server (e.g., at netmail.company.com). Mike's logon-id "mmobil01" and password (raidtoMb) for his e-mail account is checked by an associated domain server (e.g., Radius) or the mail server itself.

The high speed WLAN connection established within a few minutes of arriving off the airplane transfers all the e-mail messages received since Mike disconnected from the office server. The transfer occurs while Mike is walking from the gate to the baggage claim. Several different WLAN Access Points are utilized during this walk because the range of an Access Point is about 100-300 feet. Roaming among Access Points of a WLAN is built into the WLAN card. When a predefined drop in throughput is reached, the card scans frequencies for WLANs with a particular SSID (or an SSID of "ANY"), and then the card tries to connect and log on. The WLAN card sends an Association response to the WLAN AP. Logging can be proprietary and occurs at an application level to a logon server, and the user sends user-unique logon data with a password. Where WEP is used, all cards that can connect to a particular WLAN have the same WEP key by definition.

While waiting for the rental car shuttle, Mike reads about the hotel change on his palmtop computer.

Access to the Internet via the WLAN allows Mike to call up a map to the new hotel before the shuttle arrives.

As the shuttle pulls away from the curb, WLAN coverage is lost. A message is sent via the pager inbound to the pager service (e.g., by Arch Wireless, Inc.) indicating that the airport WLAN is no longer nearby. The WLAN card enters a "doze" or "sleep" mode to save battery power. On the drive to the hotel, additional e-mail messages arrive at the e-mail server. A notice is sent over the pager channel that causes the WLAN card to wake up (i.e., exit the doze mode) and to search for service. Finding none, the card dozes again.

Dozing, sleeping, and waking are defined in the 802.11 standards. Proprietary implementations can alter the time parameters involved, but the basic behavior is prescribed by standard. Power consumption is different in each of the three modes.

In the hotel parking lot Mike opens the palmtop computer and issues a "scan" command to cause the WLAN card to search again. Alternatively, he could have waited until another e-mail notice came over the paging channel or let a periodic wake-up-and-scan routine discover the hotel's WLAN system. Just as at the airport, the WLAN card is already programmed with an SSID such as "hotel" and a WEP Key such as '67b55c90a8'. While Mike is getting his baggage from the trunk, Mike's palmtop computer beeps and displays a dialog box showing the hotel chain logo and asking him for his guest room number and passcode, which serves as logging onto the hotel's WLAN. Mike selects an alternative button for Check In and puts the computer in his pocket. By the time he is inside the hotel, new e-mail messages have been downloaded. An IM arrives while Mike is checking in from Lee asking about the hotel.

During the drive from the hotel the WLAN is lost just as on the drive from the airport to the hotel, but on arrival at the field office the company WLAN is detected and logged onto automatically, using an SSID such as "company-Mobil" and a WEP Key such as '334401cde9'. Mike's boss and Lee both send IMs to Mike and Mike is connected to the company database and file server. Mike is able to pull up old requisition files and compare local copies with corporate copies in the course of his work.

On completion of his work, Mike is able to upload his report and associated files via the company's WLAN.

Second Case

In another use case, a mobile user Tom has a varied pattern and demand. Tom is a consultant for a large computer and computer services company, and travels frequently to customer locations around the country. He needs to connect to the Internet and collect his e-mail messages from a Web-based email system such as Hotmail and use an IM system such as Yahoo Messenger. Occasionally, he connects to local networks of his clients to examine their servers and files.

Tom tends to have approximately two days notice of where he is going next and then he stays there for as little as one day or as long as three or four months. Usually, he has no knowledge about his clients' LANs, if any, until he arrives.

Like Mike, Tom has an SSID for his home-office programmed into his WLAN card along with its WEP Key "09f934aded". On arrival at his client's office, he checks his pager for connectivity. His WAN provider (e.g., Arch Wireless, Inc.) has negotiated with his clients or nearby businesses to establish a contractual arrangement for visiting WLAN users. If the client Tom is visiting has negotiated with his WAN provider, the SSID and WEP Key, if any, for the client's WLAN are available through a central provisioning point. Tom's WAN provider supplies a list of WLANs to Tom's pager/WLAN card (FIG. 6 illustrates an example of the list). Tom can also request a list of WLANs in a particular postal zip code or other geographic location in advance or on arrival.

The list shows the SSID and WEP Key for each available WLAN, along with rates (e.g., dollars per minute) for data transfer. The list is delivered in a two-way page communication (e.g., using FLEXSuite) that identifies the list as WLAN systems presumed to be near Tom's identified geographic location, plus a record for each of the systems. In addition, proxy or gateway information to exit the LAN and access the Internet is provided (in particular, in the case of a wired LAN, the LAN portion of the WLAN may have a bastion host or proxy/gateway that is traversed by Internet data traffic). The application in Tom's palmtop computer accepts the list and displays relevant portions to Tom to aid him in selecting the most appropriate WLAN system or group of systems. If in a particular instance no WLAN system is shown for his client, Tom asks about connectivity, wired or wireless. Tom can connect directly through a network interface card (NIC) to the client's wired LAN, programming gateway and proxy information manually as needed. Tom can also plug in a wireless access point into the client LAN specifically set up for his WLAN card.

When charges have accrued to Tom's usage, a dialog box remains open until he closes it showing details of his connections.

The technique (including one or more of the procedures described above) may be implemented in hardware or software, or a combination of both. In at least some cases, it is advantageous if the technique is implemented in computer programs executing on one or more programmable computers for the infrastructure elements (control point, gateway, databases and access points), such as a general purpose computer, or a computer running or able to run Microsoft Windows 95, 98, 2000, Millennium Edition, NT, XP; Unix; Linux; Solaris; or MacOS; or for the wireless device a low-power microcomputer running Windows CE, PalmOS, or a microcomputer pre-programmed with Hewlett-Packard's OS; that each include a processor such as an Intel Pentium 4, a storage medium readable by the processor (including volatile and non-volatile memory and/or storage elements), at least one input device such as a keyboard, and at least one output device, e.g., connecting to a telecommunication medium, such as T-1 to the Internet for the infrastructure elements. Program code is applied to data entered using the input device or received from another source to perform the method described above and to generate output information. The output information is applied to one or more output devices such as a display screen of the computer, or to another application or computer, or to a communications adapter suitable for a data connection, such as Ethernet.

In at least some cases, it is advantageous if each program is implemented in a high level procedural or object-oriented programming language such as C, C++, Java, or VisualBasic to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, one or more of the methods and apparatus described above may be used for providing services other than directing data transfer between a WLAN and a WWAN to a wireless device, such as alert or timing services.

What is claimed is:

1. A method comprising:
    identifying and obtaining from a separate wireless wide area network (WWAN) control point a list of wireless local area networks (WLANs);
    identifying and obtaining access information for at least one of the WLANs on the list from the separate WWAN via a narrowband paging network with a wireless device, the WWAN and WLANs on the list being different networks;
    relating the access information to an authorizing entity of the at least one WLAN from the wireless device, the access information including one or more of frequency, modulation, a server set identifier, and an identifier portion of a MAC address; and
    based on the access information, establishing a connection between the wireless device and the at least one WLAN.

2. The method of claim 1, the access information including frequency, modulation, a server set identifier, and an identifier portion of a MAC address.

3. A method comprising:
    identifying and obtaining a list of wireless local area networks (WLANs) from a separate wireless wide area network (WWAN) control point via a narrowband paging network with a wireless device, the WWAN being a different network from the WLANs on the list; and
    based on the list, attempting to establish a packet data connection with at least one of the WLANs on the list with wireless device by the control point relating access information to an authorizing entity of the at least one WLAN, the access information including one or more of frequency, modulation, a server set identifier, and an identifier portion of a MAC address.

4. A method comprising:
    identifying a wireless device and at least one wireless local area network (WLAN) from a list of WLANs not presently communicating with the wireless device from a control point of a separate wireless wide area network;
    providing identifying information of the at least one WLAN of the list of WLANs to the wireless device from a control point of a separate wireless wide area network;
    conveying access information from the control point via the separate wireless wide area network to the wireless device sufficient to enable the wireless device to communicate with at least one of the WLANs of the list of WLANs, the separate wireless wide area network and WLANs being different networks, wherein the conveying access information via the separate wireless wide area network includes conveying access information via a narrowband paging network; and
    relating the access information by the wireless device to a control point of the at least one of the WLANs to authorize the wireless device to utilize a service through the at least one of the WLANs, the access information including one or more of frequency, modulation, a server set identifier, and an identifier portion of a MAC address.

5. The method of claim 4, further comprising the wireless device confirming to the control point that access has been granted.

6. The method of claim 4, further comprising: reporting charges for usage of services through the WLAN to a billing service.

7. The method of claim 4, further comprising: validating the identity of the wireless device before permitting access to the WLAN.

8. The method of claim 4, further comprising: authenticating the identity of the user of services through the WLAN before permitting the usage of services.

9. The method of claim 4, further comprising: using a wireless wide area network (WWAN) location to approximate proximity to the WLAN.

10. The method of claim 4, further comprising: using a geo-location network to approximate proximity to the WLAN.

11. The method of claim 4, further comprising: using location information supplied by the user to approximate proximity to the WLAN.

12. A system comprising:
   a first information identifier identifying at least one wireless local area network (WLAN) for a wireless data device from a list of WLANs from a separate wireless wide area network control point;
   a second information identifier identifying access information for the at least one of the WLANs on the list from the separate wireless wide area network via a narrowband paging network, the separate wireless wide area network and WLANs on the list being different networks;
   an information relater relating the access information to an authorizing entity of the at least one WLAN, the access information including one or more of frequency, modulation, a sewer set identifier, and an identifier portion of a MAC address; and
   a connection establisher establishing, based on the access information, a connection between the wireless data device and the at least one WLAN.

13. The system of claim 12, wherein the separate wireless network is a wireless wide area network, and the wireless device receives data from the wireless wide area network and from the WLAN.

14. Apparatus comprising:
   a first information identification mechanism identifying at least one wireless local area network (WLAN) for a wireless data device from a list of WLANs from a separate wireless wide area network control point;
   a second information identification mechanism identifying access information for the at least one of the WLAN on the list from the separate wireless wide area network via a narrowband paging network, the separate wireless wide area network and WLANs on the list being different networks;
   an information relating mechanism relating the access information to an authorizing entity of the at least one WLAN, the access information including one or more of frequency, modulation, a server set identifier, and an identifier portion of a MAC address; and
   a connection establishing mechanism establishing, based on the access information, a connection between the wireless data device and the at least one WLAN.

15. A computer readable medium encoded with a set of instructions when executed by a computer system, the set of instructions causing the computer system to:
   identify and obtain from a separate wireless wide area network control point a list of wireless local area networks (WLANs);
   identify and obtain access information for at least one of the WLANs on the list from the separate wireless network via a narrowband paging network, the separate wireless network and the WLANs on the list being different networks;
   relate the access information to an authorizing entity of the at least one WLAN, the access information including one or more of frequency, modulation, a server set identifier, and an identifier portion of a MAC address; and
   based on the access information, establish a connection between a wireless data device and the at least one WLAN.

* * * * *